United States Patent
Tseng

[19]

[11] Patent Number: 6,161,858
[45] Date of Patent: Dec. 19, 2000

[54] MOUNTAIN BIKE FRAME

[75] Inventor: Diing-Huang Tseng, Changhua Hsien, Taiwan

[73] Assignee: Merida Industry Co., Ltd., Changhua Hsien, Taiwan

[21] Appl. No.: 09/332,633

[22] Filed: Jun. 14, 1999

[51] Int. Cl.[7] .................................................. B62K 1/00
[52] U.S. Cl. ....................... 280/281.1; 280/282; 280/283; 280/284; 280/285
[58] Field of Search ............................. 280/281.1, 281, 280/282, 283, 284, 285

[56] References Cited

U.S. PATENT DOCUMENTS

| | | | |
|---|---|---|---|
| 1,047,430 | 12/1912 | Michaelson | 280/281.1 |
| 1,601,392 | 12/1926 | Holtzman | 280/281.1 |
| 3,948,543 | 4/1976 | MacDonald et al. | 280/284 |
| 3,966,006 | 6/1976 | Cullinan | 280/284 X |
| 3,982,770 | 9/1976 | Satoh et al. | 280/284 |
| 4,046,396 | 9/1977 | Taylor et al. | 280/281 |
| 4,378,857 | 4/1983 | Anderson | 280/283 X |
| 5,441,292 | 8/1995 | Busby | 280/284 |

*Primary Examiner*—Lanna Mai
*Assistant Examiner*—Toan To
*Attorney, Agent, or Firm*—Thomas, Kayden, Horstemeyer & Risley LLP

[57] ABSTRACT

The invention discloses a mountain bike frame. In this mountain bike frame, a connection plate is fixed onto one end of the rear fork and is connected to the frame by two rotatable joints and a shock absorber. The main objective of the invention is to provide a mountain bike frame which is able to effectively lower the impact of shocks, to get rid of the phenomena of chain slip and reversal, and is able to reduce the "vibration" by a strong structure.

5 Claims, 4 Drawing Sheets

MOUNTAIN BIKE FRAME

FIELD OF THE INVENTION

The invention relates to a mountain bike frame, especially to a mountain bike frame that is able to effectively lower the impact of shocks and to keep the tension on the chain during a shock.

BRIEF DESCRIPTION OF THE PRIOR ARTS

Mountain biking is becoming more and more popular. Mountain bikes are specially designed for mountain terrain. Compared with an ordinary bike, the mountain bike has wider tires that are able to provide more friction and better shock absorption and a frame that is often provided with some means of shock absorption which, at present, is either provided on the front fork or the frame itself. To effectively reduce the shock of the seat, the latter method is more often adopted. However in this kind of structure, there are a number of serious problems.

First, when the rear wheel encounters a shock, it will first move upward with respect to the frame. In the present mountain bike, this will cause the distance between the rear axle and the crank axle be shortened. The shortened distance will loosen the chain on the sprockets and thus make the user lose power to the back wheel. Also, after the shock when the rear wheel resumes its normal position, the sudden application of tension to the chain will pull the peddles backwards. Both of these phenomena are potentially very dangerous for a user.

Second, the strength of the rear fork, which is attached to the frame by a single pin is always not adequate. A great literal force may cause an undesired "vibration" to the left or right of the rear fork.

SUMMARY OF THE INVENTION

The main objective of the invention is to provide a mountain bike frame that is able to effectively lower the impact of shocks, to avoid the phenomena of chain slip and reversal, and reduce "vibration" by a stronger structure.

DETAILED DESCRIPTION OF THE PREFERRED EMBODIMENT

Figure 1:
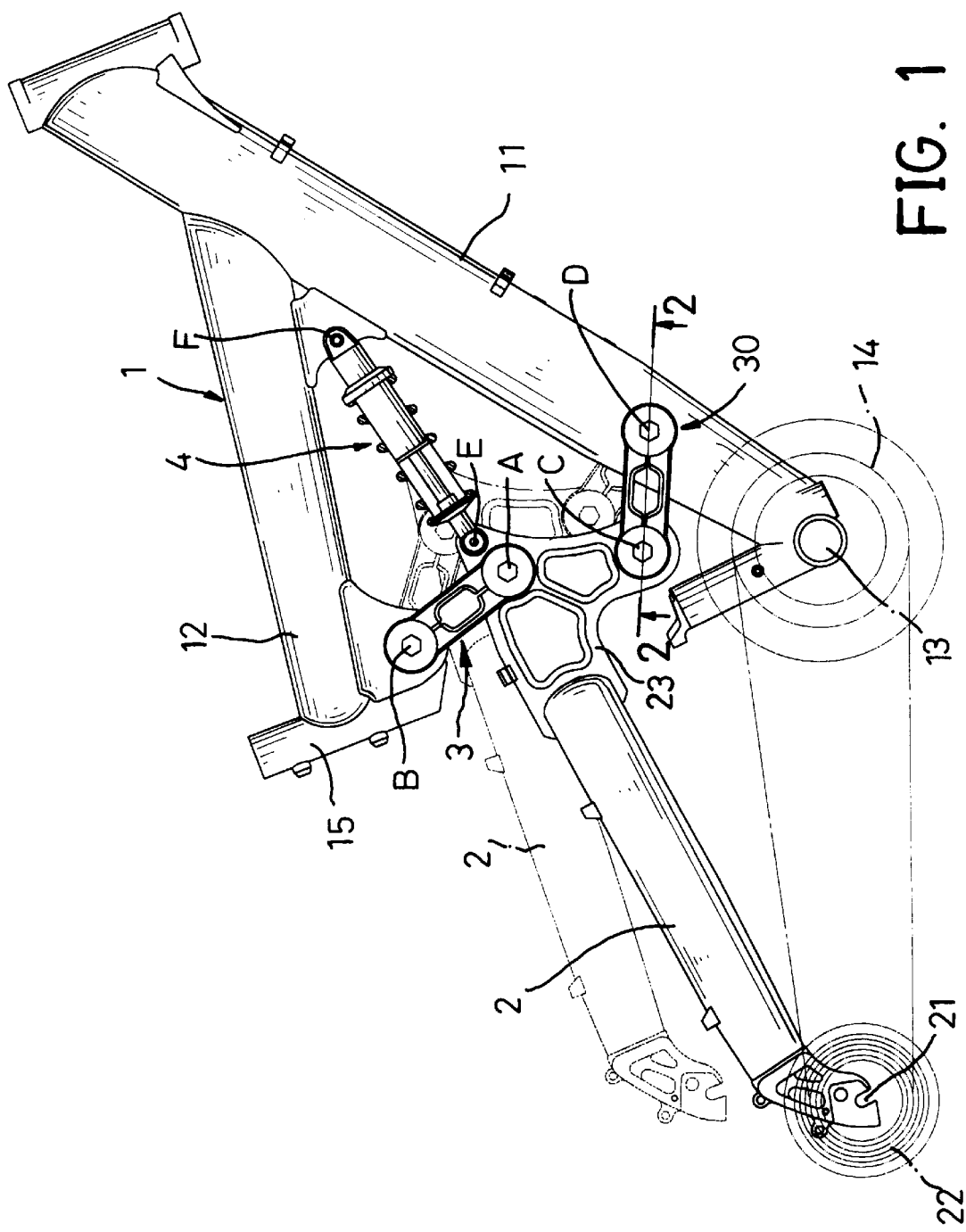
FIG. 1 is a side plan view of the mountain bike frame in accordance with the present invention.

Referring to FIG. 1, the invention comprises two main parts, the mountain bike frame 1 and rear fork 2.

The mountain bike frame 1 consists of a down tube 11, a top tube 12 and a seat tube 15. The down tube 11 and the seat tube 15 join at a bottom bracket 13 that contains an axle. The axle has a front chainwheel 14 fixed at one end thereof.

A rear axle 21 with a rear chainwheel 22 is attached to the distal end of the rear fork 2. The other end of the rear fork 2 has a pair of parallel connection plates 23 that are located within the triangular area formed by the down tube 11, top tube 12 and seat tube 15. These connection plates 23 are attached to the frame 1 by means of two joints 3, 30 and a shock absorber 4.

The lower end of the top tube joint 3 is pivotally fixed at a point A on the upper portion of the connection plates 23; the upper end of the top tube joint 3 is pivotally fixed at a point B where the top tube 12 and the seat tube 15 join. One end of the down tube joint 30 is pivotally fixed at a point C located on the lower portion of the connection plates 23; the other end of the down tube joint 30 is pivotally attached at a point D located at the lower half portion of the down tube 11. By referring to the directions in FIG. 1, point C is lower and farther right than point A, and point D is farther right and a little lower than point C. The shock absorber 4 is mounted between a point E, a point at the top of the connection plates 23, and a point F where the top tube 12 and the down tube 11 join, pivotally at both points (E, F). Point E is higher and farther right than point A.

Figure 2:
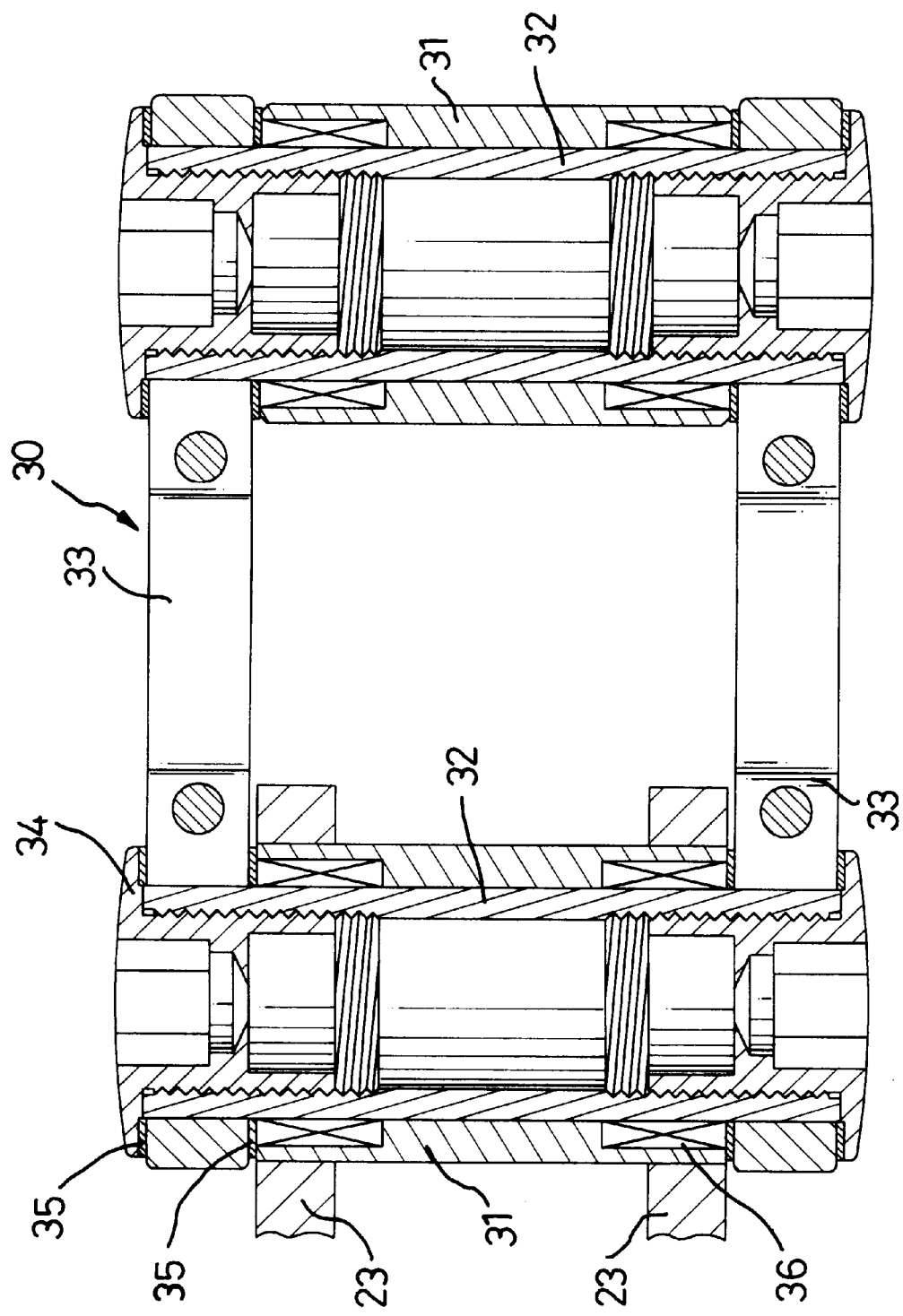
FIG. 2 is a top plan cross-sectional view of the rear fork to frame joints in accordance with the present invention.
Figure 4:
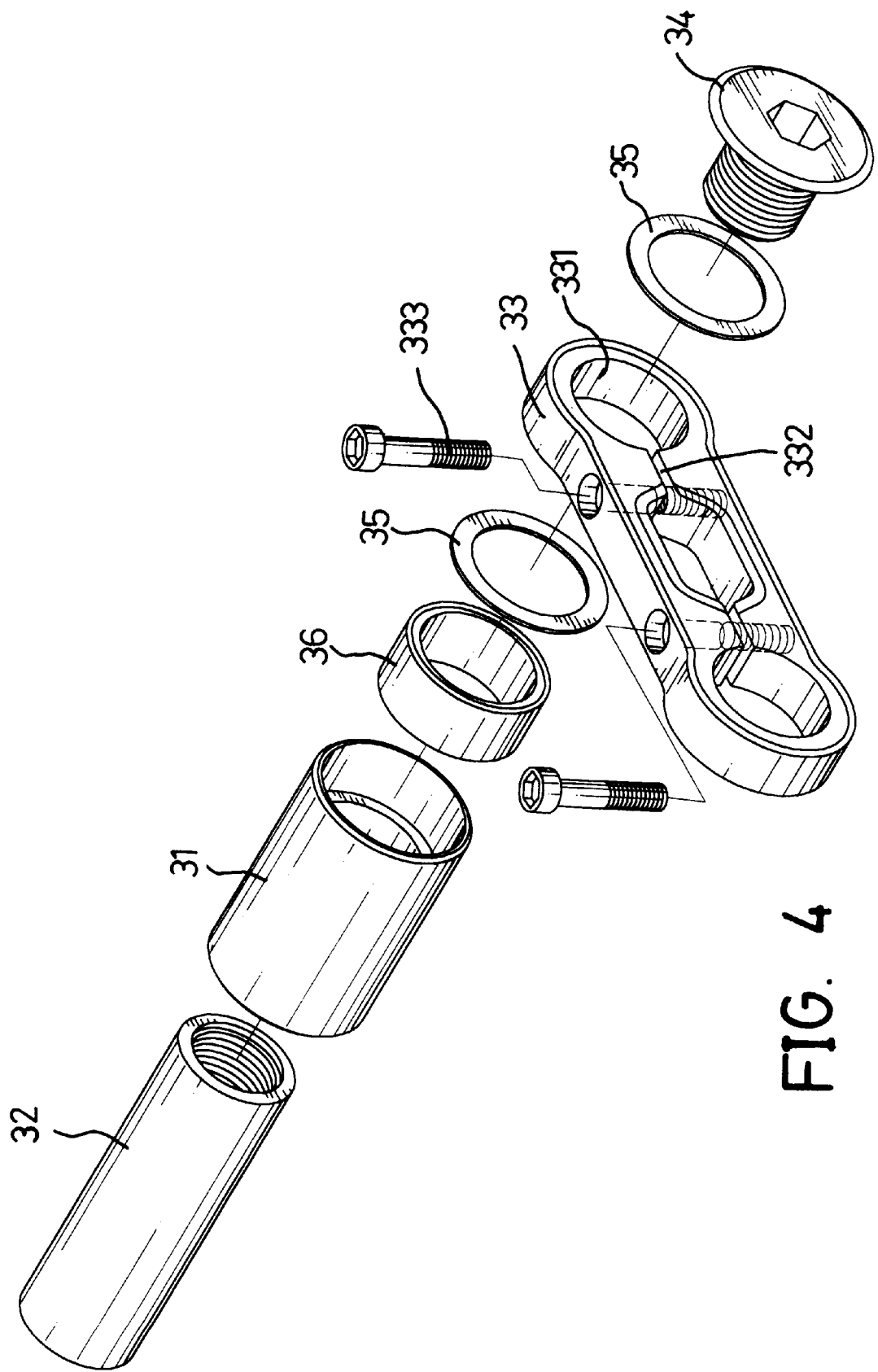
FIG. 4 is an exploded perspective view of the frame joint in FIG. 2.

With reference to FIGS. 2 and 4, only the down tube joint 30 is shown, because the top tube joint 3 is identical. The down tube joint 30 comprises an outer tube 31 containing an inner tube 32. The ends of the inner tube 32 protrude out from the outer tube 32 and are covered by an opening 331 in a connection clamp 33. A threaded cap 34 is then screwed onto the inner tube 32 to environmentally seal the inside of the inner tube 32. A pair of gaskets 35 may be provided between the connection clamp 33 and the cap 34, and between the outer tube 31 and the connection clamp 33 to environmentally seal the inside of the outer tube (31). The outer and the inner tube 31, 32 are connected by means of a pair of bearings 36 which are able to provide a rotatable and firm connection thereof. Additionally, a gap 332 is provided between the sides of the connection clamp 33 to allow the sides of the connection clamp 33 to be drawn together by a pair of bolts 323 to squeeze and hold the inner tube 32 in the opening 331.

Figure 3:
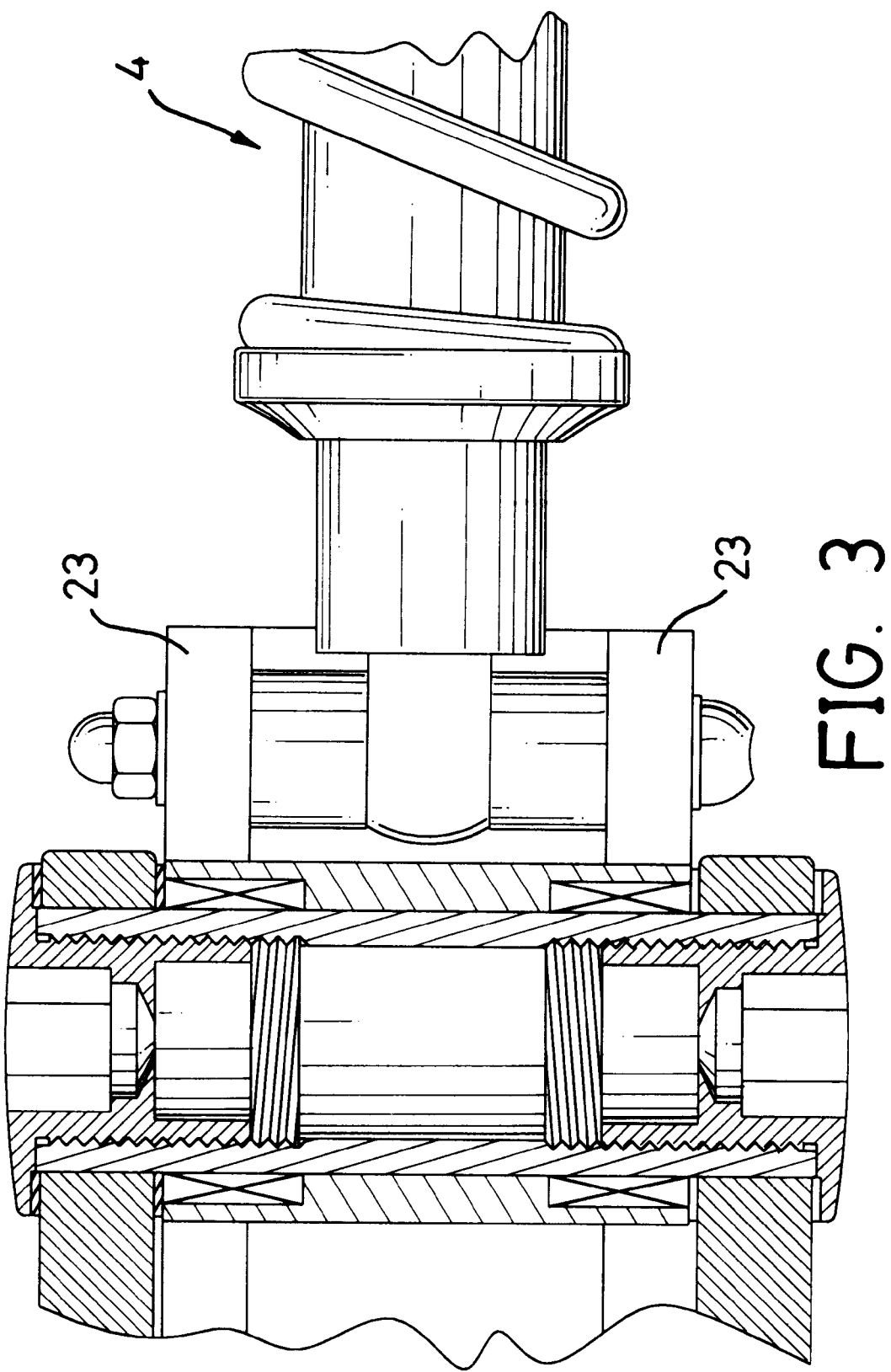
FIG. 3 is a top plan view in partial section of the connection plate and the shock absorber.

A shown in FIGS. 1 and 3, the shock absorber 4 is mounted between points E and F. No more detailed description on the shock absorber 4 will be provided here because it is conventional except for where it is mounted with respect to the other joints.

The movement of point E, caused by the movement of the rear fork 2 (shown in phantom line in FIG. 1), will be in the line with the shock absorber 4. This will ensure that a strain is maintained on the chain at a normal level and thus reduce the phenomena of chain slip and reversal. In addition, the joints 3, 30 together with the shock absorber 4 will effectively reduce the transmitted shock. Finally, the rear fork 2 is fixed onto the frame 1 by two strong inner tubes 32 and four bearings 36. These attachment fixtures provide the rear fork 2 a very strong connection and thus will greatly lower the "vibration" of the rear fork 2.

What is claimed is:

1. A mountain bike frame comprises a connection plate provided on one end of the rear fork wherein the connection plate is attached to the frame by means of two joints and a shock absorber, wherein one end of the top tube joint is pivotally fixed at a point on the upper portion of the connection plates; the upper end of the top tube joint is pivotally fixed at a point where the top tube and the seat tube join;

one end of the down tube joint is pivotally fixed at a point located at on the lower portion of the connection plates; the other end of the down tube joint is pivotally fixed at a point located on the lower half of the downtube;

the point on the lower part of the connection plate is farther right than the upper point on the connection plate connected to the top tube joint, and the point on the down tubeis farther right and a little lower than the down tube joint connection point on the connection plate;

the shock absorber is pivotally attached between a point at the top of the connection plates, and a point where the toptube and the downtube join;

the shock absorber connection point on the frame is higher and farther right than top tube joint connection point on the top tube.

2. A mountain bike frame as claimed in claim 1, wherein the joints comprise:

a pair of outer tubes;

a pair of inner tubes respectively contained in the outer tube; a pair of connection clamps each having a pair of openings to hold the ends of each inner tube protruding out from the outer tubes;

four threaded caps screwed onto the ends of the inner tubes to provide protection from the environment;

two pair of bearings provided between each outer and the inner tube and to provide a rotatable and firm connection thereof.

3. A mountain bike frame as claimed in claim 2 wherein a gap is provided between the sides of the connection clamp to allow the sides of the connection clamp to be drawn together by a pair of bolts to squeeze and hold the inner tube in the opening.

4. A mountain bike as claimed in claim 3, wherein gaskets are provided between the connection clamps and the caps.

5. A mountain bike as claimed in claim 3, wherein gaskets are provided between the inner tubes and the connection clamps.

* * * * *